July 27, 1926.
S. V. STIOKOFF
ANIMAL POKE
Filed March 4, 1926
1,594,280
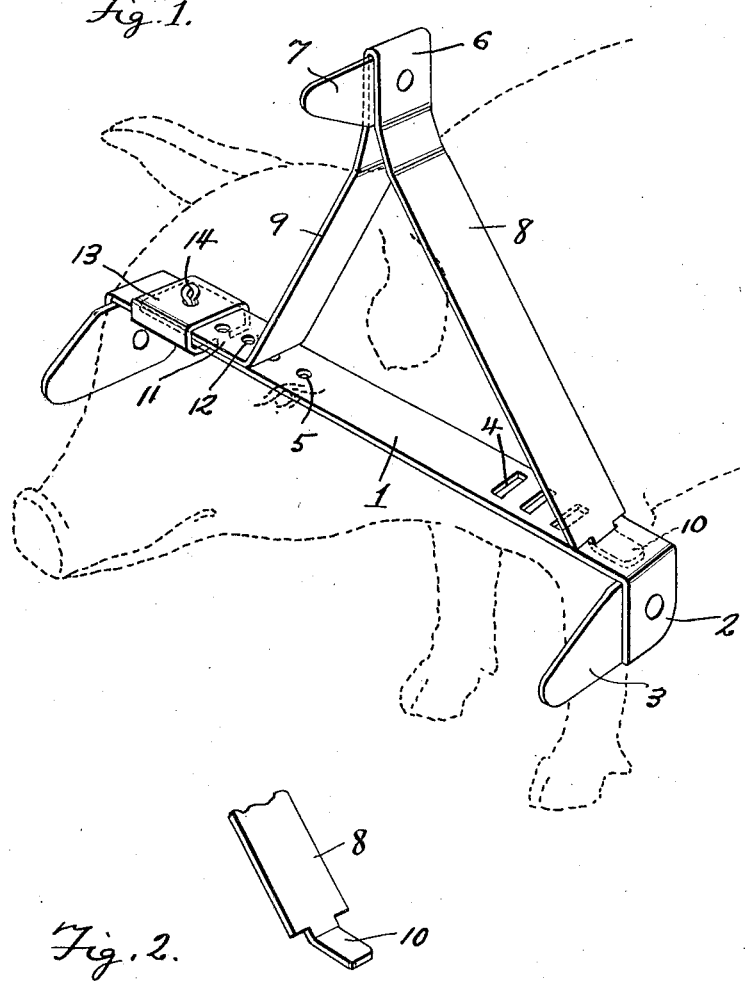
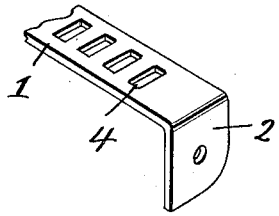
Steve V. Stiokoff,
INVENTOR
BY Victor J. Evans
ATTORNEY
WITNESS: Gerald Hennesy Patented July 27, 1926.

1,594,280

UNITED STATES PATENT OFFICE.

STEVE V. STIOKOFF, OF YOUNGSTOWN, OHIO.

ANIMAL POKE.

Application filed March 4, 1926. Serial No. 92,291.

My present invention has reference to an animal poke.

My object is the provision of a poke that is of a light, strong but simple nature, and which is adjustable so that the same can be readily arranged around the neck of different sized animals.

A further object is the provision of an animal poke, that is wholly constructed of light strong metal to include a bottom or base portion that has on its ends outwardly directed beveled deflector fingers and which has arranged thereon in a simple but secure manner a substantially U-shaped yoke or body portion whose apex is also provided with an outwardly directed deflector finger, there being simple interengaging means between the yoke and the base to permit of the adjustment of these elements with respect to each other, and likewise to effect in easily, quickly, but securely attaching the yoke to the base.

To the attainment of the foregoing and other objects which will present themselves as the nature of the invention is better understood, the improvement resides in the construction, combination and operative association of parts, a statisfactory embodiment of which is exemplified by the accompanying drawings.

In the drawings:

Figure 1 is a perspective view of the improvement in applied position.

Figure 2 is a fragmentary detail perspective view to illustrate the manner in which one end of the yoke is adjustably associated with the base member of the improvement.

Preferably my improvement is wholly constructed of strap iron, which is light and strong. The improvement includes a plate 1 which I will refer to as the base plate. The plate has both of its ends flanged downwardly, as at 2, and fixedly secured to said flanges 2 there are outwardly extending deflector plates or fingers 3. The upper edges of these fingers are beveled.

The plate 1, adjacent to one of its flanged ends 2, is provided with equidistantly spaced transversely arranged openings 4, and the said plate, at a distance from its opposite end is provided with a series of spaced apertures 5.

The yoke or body member of the improvement is formed from a single strip of metal which is centrally bent upon itself, as at 6. In this bent portion there is fixed an outwardly extending deflector plate or finger 7 that has its lower edge beveled. From the centrally bent portion the metal member comprising the yoke is extended to provide arms 8 and 9 which are disposed at opposite inclinations. The arm 8 has its free end reduced and formed with an offset tongue 10 that is designed to be received in any one of the openings 4. The outer end of the arm 9 is bent angularly, as at 11, and this bent portion is provided with one or a plurality of apertures 12 to register with the apertures 5. Slidable over the flanged end 11 of the arm 9 there is a sleeve 13 formed by bending a piece of strap metal, the said sleeve being also slidable over the base member 1. This sleeve has a single aperture therethrough, and passing through this aperture there is an element 14, such as a cotter pin, whose legs are also passed through one of the registering openings 11 and 5. The legs of the cotter pin are spread and with a construction as above described it will be noted that the yoke-like body may be easily, quickly, adjustably and fixedly secured on the base plate 1.

The simplicity of my improvement and the advantages thereof, will commend themselves to those skilled in the art to which such inventions relate. The use of the device is so well known that a detail description thereof is not believed herein necessary, it being apparent that the animal, on which the poke is arranged will be prevented from passing through the line wires of wire fences, stopped from rooting to any determined extent in the ground and that the construction is such as to inflict no injury upon the animal. The adjustability of the device is an important feature thereof.

I do not wish to be restricted to the precise details of construction herein set forth and hold myself entitled to such changes therefrom as fairly fall within the scope of what I claim.

Having described the invention, I claim:—

1. An animal poke, including a base plate, having downwardly extending ends provided with outwardly projected deflector fingers, a yoke-like body having one end hingedly secured to the base plate, means for securing the second end of the yoke to the base plate and said yoke having an outwardly extending deflector finger on the apex thereof.

2. An animal poke comprising a flat base plate having downwardly directed ends provided with outwardly extending deflector fingers, said plate, adjacent one of its ends, having spaced aligning transverse openings therethrough, a substantially V-shaped yoke having an outwardly extending deflector finger at the apex thereof and having one of its ends formed with an offset tongue to be received in one of the openings in the base plate, and its second end offset to rest on the base plate and means for adjustably securing the last mentioned end of the yoke on the base plate.

3. An animal poke comprising a flat base plate having flanged ends provided with outwardly directed deflector fingers, said plate, adjacent to one of its ends, having a series of transversely arranged openings therethrough and having a series of longitudinally extending apertures adjacent to its second end, a V-shaped yoke made from a single plate, an outwardly extending deflector finger at the apex of the yoke, said yoke having one of its arms centrally formed with an offset tongue to be received in one of the openings in the base plate, the second end of the yoke being flanged to overlie the base plate and formed with a series of apertures to register with those in the base plate, a slidable sleeve on the base plate designed to ride over the mentioned flange of the yoke and a removable element adapted to pass through the sleeve and through the registering openings in the flanged end of the yoke and the base plate.

In testimony whereof I affix my signature.

STEVE V. STIOKOFF.